United States Patent
Miller

(10) Patent No.: US 11,861,614 B2
(45) Date of Patent: *Jan. 2, 2024

(54) CHILD SUPPORT AND CENTRALIZED DISTRIBUTION NETWORK

(71) Applicant: Eugenia Roxanne Miller, Moreno Valley, CA (US)

(72) Inventor: Eugenia Roxanne Miller, Moreno Valley, CA (US)

(73) Assignee: Eugenia R. Miller, Moreno Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,270

(22) Filed: Feb. 26, 2023

(65) Prior Publication Data
US 2023/0289796 A1   Sep. 14, 2023

Related U.S. Application Data

(63) Continuation of application No. 16/597,898, filed on Oct. 10, 2019, now Pat. No. 11,615,416.

(60) Provisional application No. 62/766,356, filed on Oct. 12, 2018.

(51) Int. Cl.
| | |
|---|---|
| *G06Q 20/40* | (2012.01) |
| *G06Q 50/22* | (2018.01) |
| *G06Q 20/06* | (2012.01) |
| *G06Q 20/08* | (2012.01) |

(52) U.S. Cl.
CPC ......... *G06Q 20/401* (2013.01); *G06Q 20/065* (2013.01); *G06Q 20/0855* (2013.01); *G06Q 50/22* (2013.01)

(58) Field of Classification Search
None
See application file for complete search history.

(56) References Cited

U.S. PATENT DOCUMENTS

| | | | | |
|---|---|---|---|---|
| 7,752,131 | B1* | 7/2010 | Polk | G06Q 40/02 705/40 |
| 7,814,011 | B1* | 10/2010 | Wilkins | G06Q 40/02 705/40 |
| 2005/0137972 | A1* | 6/2005 | Krumlauf | G06Q 20/10 705/40 |
| 2013/0066754 | A1* | 3/2013 | Atwood | G06Q 50/10 705/30 |

(Continued)

OTHER PUBLICATIONS

Taylor, Kate. "How Blockchain Might Transform Family Law," https://vardags.com/family-law/how-blockchain-might-transform-family-law (Jun. 4, 2018). (Year: 2018).*

(Continued)

*Primary Examiner* — Elizabeth H Rosen

(57) ABSTRACT

Child/family support payments are made on a multilayered consortium ledger network using blockchain, IoT, and other technologies to expedite the process and disbursement of child/family support payments. The multilayered consortium ledger network may cater to local and/or global child support agencies and/or local and global Parties/Parents/family members who elect to send child/family support payments to their family(ies) outside the traditional child support agencies/district attorney offices. The plurality of technologies used support payments made/received using, but not limited to, domestic/foreign fiat, cryptocurrency, tokens, an/or native tokens.

3 Claims, 5 Drawing Sheets

(56) References Cited

U.S. PATENT DOCUMENTS

| | | | | |
|---|---|---|---|---|
| 2017/0046526 | A1* | 2/2017 | Chan | G06Q 20/4016 |
| 2018/0322588 | A1* | 11/2018 | Linne | G06Q 40/125 |
| 2018/0336643 | A1* | 11/2018 | Li | G06Q 10/02 |
| 2019/0172023 | A1* | 6/2019 | Brandborg | H04L 9/0618 |
| 2020/0342444 | A1* | 10/2020 | Takaoka | G06Q 20/322 |

OTHER PUBLICATIONS

Katzenberg, Barbara J. "Cryptocurrency and Child Support," https://www.bjkatzenberg.com/blog/2018/03/cryptocurrency-and-child-support/ (Mar. 2, 2018). (Year: 2018).*

* cited by examiner

There are multiple entry and exit points along the payment and disbursement process.

Multifactor verification process has to be completed in order to submit payments and participant identifiers.

Once verified, payment currency is chosen and identifiers entered on self executing contract and submitted.

Once submitted and available funds confirmed, payments are dispersed to receivers of payments.

Receivers of payments access funds in account/receptacle of choice after completing multifactor verification process; able to convert payment to payment of choice.

Figure 2

Within each layer of the consortium ledger network, there is a security measure in place. At each connection point between layers and the outside world, there are advanced security measures in place to detect, block, and respond to malicious inquiries and attacks.

A multifactor verification process is in place. Blockchain cloud security along with other cloud and big data storage containers are protected. Security is at each level, with each protocol and process in the architecture.

Figure 3

CHILD SUPPORT AND CENTRALIZED DISTRIBUTION NETWORK

CROSS-REFERENCE TO RELATED APPLICATIONS

This application is a continuation application of U.S. patent application Ser. No. 16/597,898, filed on Oct. 10, 2019, pending, which has priority to provisional application, filed on Oct. 12, 2018. The entire contents of the above-identified applications are incorporated herein by reference.

CROSS-REFERENCE MATERIAL

U.S. Pat. No. 10,243,743
U.S. patent application Ser. No. 15/365,480
https://www.acf.hhs.gov/css/resource/us-ratfication-of-hague-child-support-convention
https://opensourceforu.com
https://www.investinblockchain.com/what-is-a-smart-contract/
https://blockgeeks.com/guides/smart-contracts/
https://blockchainhub.net/smart-contracts/
https://blockehainhub.net/blockchain-oracles/

BACKGROUND OF THE INVENTION

Field of endeavor to which the invention pertains. In addition, it encompasses but does not imply it is limited to the following explanations. Ledger networks like blockchain technology and/or cryptographic ledger networks are used in a form of public, private, or permissioned ledgers which maintain records of all transactions that are entered on it.

Public Blockchain: Any entity can view the transaction data without explicit authorization; any entity may enter transactions on the blockchain; they contain complex rules for added security; contains more difficult consensus algorithms; can be expensive; and no one person/entity owns the blockchain.

Private Blockchain: Authorized entities can view the transaction data; authorized entities may enter transactions on the blockchain; security is easier to maintain; it's easier to add a block to the blockchain; and private entities own the blockchain.

Permissioned Blockchain: May contain a combination of public and private blockchains where participants are granted permission to participate fully or granted permission with limitations. With this, some permissioned entities may have full view and can add transactions to the blockchain while other permissioned entities may not be granted that ability.

Some of the blockchain ledgers and transaction databases mentioned above may be utilized as a centralized, decentralized, distributed, and/or a combination of networks like consortium networks.

Centralized networks require a central authority or intermediary to verify transactions then they pass the information on to the rest of the entities in the network; the rest of the entities do not directly communicate with each other. They have to go through the central authority or intermediary first.

Decentralized networks divide the authority between entities where there are more than one centralized entity; smaller groupings of centralized networks connect to each other with connecting entities; it is not peer-to-peer.

Distributed networks are peer-to-peer networks; no one entity is in control; communicate with each other directly or indirectly by going through another entity(ies) first.

Mesh networks are peer-to-peer networks where each entity may freely communicate with each other. No one entity owns the network.

Business models can use multiple types of blockchain technology and/or cryptographic networks where each is dedicated to a specific business service, internally and/or externally. On each blockchain network and supporting system, multiple Externally Owned Accounts (EOAs) can be created and used. All transactions on a blockchain network are initiated by EOAs. The self-executing contract code and/or smart contract is executed when transactions are sent by EOAs or by messages sent by other contracts and/or data vehicles like oracles, to the Contract Code Account. EOAs have the capacity to hold a balance of, but not limited to, crypto currencies, tokens, stable coins, fiat, non-currency items and business tokens associated with a blockchain network. EOAs have public-private key pair associated with it. Entities are able to create and use them to send and receive transactions. The private key is encrypted with a password and kept private by the entity while the public key is considered the account address. The public key is made public and considered the address others are able to send transactions through. The private key is needed in order to send transactions to others.

Contract Code Accounts have their own code and are controlled by code. A Contract Code Account is created and controlled by the associated self-executing contract code which is stored with the account. This code can be stored, verified and executed on a blockchain and other supporting platforms. When a self-executing contract is executed on a blockchain platform, it is recorded on a ledger and viewable by permissioned parties linked to the platform. The self-executing contract works off the "If-Then" premise: "If" the predefined conditions coded in the self-executing contract are met when a Contract Code Account receives a message from an EOS or another contract account and/or oracle, "then" the corresponding action(s) contained within the code of the self-executing contract will execute.

Contract accounts can also send transactions to other EOAs or other contract accounts and oracles. Self-executing contracts, like smart contracts, digitally facilitate, verify, and/or enforce the negotiation or performance of said contract or agreement. In addition, the predefined code in a self-executing contract can determine if an item or items should be sent to one or more designees as well as if the item(s) need to be returned to the sender or a combination thereof.

Self-executing contracts, like but not limited to smart contracts, utilize "systems" to receive and send information to/from the external world. A way this is accomplished is by the use of data vehicles like oracles. Oracles send and verify any external data and submits this to the self executing contract, like smart contracts. Depending on the predefined actions coded in the self executing contract, it may be triggered to conduct those predefined actions and enables transactions on the corresponding blockchain technology in use. The different types of data vehicles are, but not limited to, software oracles, hardware oracles, inbound oracles, outbound oracles, consensus-based oracles. There is a plurality of oracles that can be but not limited to centralized, decentralized (like Chainlink), distributed, and the like without limitation. Their capability to receive and send information to and from self executing contracts range from data found online, the physical and/or external world as well as multiple oracles and different types of oracles working together to provide consensus-based data to and from self executing contracts and the real world. Big data centers and cloud-based services are also utilized to remotely and/or locally store data, which is accessed and retrievable by permissioned entities. The technologies mentioned above would greatly improve and expedite the disbursement of child/family support payments as well as track payments made and received. These examples are in no wise meant to limit the scope of the invention and its intended purposes.

Blockchain, IoT, and self-executing contracts are being used in a variety of industries, like but not limited to, banking, voting, energy, government/e-government, entertainment, and telecommunication. Self-executing contracts range from simple to complex. Governmental and semi-governmental registries are examples for simple use cases while decentralized autonomous organizations (DAO) are the most complex.

In 2016, then President Barack Obama approved the Hague Convention on the International Recovery of Child Support and Other Forms of Family Maintenance (Hague Child Support Convention). At that time there were around 15 million child support cases, which included 150,000 enforced foreign cases. Families in the United States (US) were and still are able to receive support even when one of the parents lives in a foreign country. The US has reciprocity with over 30 countries who have been and are continuing to work together to establish and enforce child support orders. That said, the countries the US has reciprocity with have agreed to honor wage assignments/garnishments issued by the US. Obligors ordered to pay support may personally make payments on their own, and/or via wage garnishments by their employer(s), and/or third parties are able to make payments on the Obligors' behalves.

In certain instances, child support payments are made to child support agencies as a result of a child support case being opened with that agency. In some states, the district attorney's office is managing the child support cases. Child support payments are submitted directly to child support agencies/district attorneys' offices or child support payment processing centers on behalf of obligors for further payment processing and disbursement to Obligees. They are made domestically or internationally by domestic and foreign employers/obligors/those paying on behalf of the obligors.

Obligors are those bound to render items and/or services and Obligees are those that are bound to receive items and/or services. For purposes of child support payments, obligors are bound by a court order to make child support payments to Obligees who are bound to receive said support, per court order. In referring to both obligor(s) and Obligee(s), the term "Parties" will be used for ease of reading.

Child support payments can be made a variety of ways and is not limited to the following: garnishments from domestic and foreign employers; direct payment by the Obligor(s) and/or their representatives; third party payments, payments on behalf of the employer and/or Obligor(s) representatives; and via tax and financial institutions' levies and/or interceptions.

Payments can take a variety of forms and come from a variety of sources like the following: employers, Electronic Funds Transfer (EFT)-Automated Clearinghouse (ACH) credit/debit, cash, check/money order/cashier's checks, credit/debit card withdrawals, sent from financial institutions, tax entity intercepts, trust funds, inheritance liens, and liens on property. Payments can be made by a variety of means like but not limited to postal service (mail), in person where child support payments are accepted, online services, payment phone system, mobile devices, payment kiosks, PayPal, MoneyGram, PayNearMe, and automatic deductions from financial institutions and other accounts.

During national holidays as well as "outside normal business hours", garnishments/payments received by the child support affiliates involved in processing payments are not actually worked because those locations are closed and their corresponding systems are not processing payments. Submitted child support payments sit in their financial institutions and are not worked timely. These closures delay the processing of garnishments/payments credited to obligors and disbursed to Obligees.

Blockchain, self executing contract solutions, and a plurality of networks will help to resolve and/or eliminate these additional delays in the current system. Child support payments and payment identifying information are able to be submitted on self executing contracts by obligors, employers, and all senders of payments, then sent to the child support agency for verification purposes and once verified, payment is disbursed to Obligees. The process allows payment to be disbursed to families at a faster rate.

For illustrative purposes, those who are not bound to render items and/or services but agree to do so outside the child support agencies are called "Parent/Legal Guardian 1". For illustrative purposes, those who may not be bound to receive items and/or services but agree to do so outside the child support agencies are called "Parent/Legal Guardian 2". Collectively, Parent/Legal Guardian 1 and Parent/Legal Guardian 2 are referred to as "Parents" for illustrative purposes and is in no wise meant to limit the scope of the invention and its intended purposes. Parents often decide to make their own agreement and payment support without the assistance of child support agencies.

In certain instances, a number of Parties have court orders for child support and/or an open child support case with child support agencies/district attorney offices for enforcement and management. However, in some instances, they close their child support cases, agree to make/receive child support directly with each other, and commence to doing so instead of going through the child support agency(ies)/district attorneys' office(s). Likewise, there are Parents that may or may not have child support cases open and if open, agree to close their cases so one parent may pay the other parent support directly outside of child support agency(ies)/district attorney enforcement and management of their case(s).

The challenges with this is inadequate record keeping of payments made and/or received by the Parties/Parents. If the Parties/Parents ever decide to open or reopen a child support case, they may have inadequate records of payments made/received and payments made. The Obligor or "Parent 1" may be stuck having to pay monies over again due to a lack of adequate tracking of child support payments made on their own. This blockchain solution will not only track payments made, which credits the obligor/parent paying support, it will also expedite payments made, further decreasing the time it takes for Obligees/Parents 2 to receive much needed child support in a timely manner. In some embodiments, Parties/Parents will be able to print payments made using the blockchain solution for tax purposes and other needs.

It is time consuming to locate payment records and determine who sent what amount and who received said amount. It can sometimes be determined in court based on available records. Often time, accurate accounting of monies paid and received don't equate. There are situations where Obligors/"Parents 1" paid support outside of using the child support agency/district attorneys' offices and due to a lack of record keeping, were found to still be owing support and ordered to pay support again for that same time period. The consortium ledger solution using blockchain and self executing contracts along with a plurality of networks, are available to make the process of making, disbursing and receiving child support payments more efficient, faster, securely, on trackable platforms without limitation of its benefits. Payments sent to child support agencies to be disbursed to Obligees, are done so securely and at a faster rate with the use of a plurality of networks including blockchain and self executing contracts. The examples mentioned are for illustrative purposes and is in no wise meant to limit the scope of the invention and its intended purposes.

BRIEF SUMMARY OF THE INVENTION

In certain instances, Parties have court orders for child support and/or an open child support case with child support agencies/district attorney offices to obtain, enforcement and manage child support/family orders. Payments are made by obligors, domestic and foreign employers, third parties on behalf of obligors to name a few. Payments are sent to child support agencies/district attorneys' offices for disbursement to Obligees. There are delays in the current system if the contracted payment processing centers are closed due to a variety of reasons like holidays, weekends, outside of normal processing hours. The use of a multilayered consortium ledger network, like some blockchain platforms, will help to expedite payments so needy families receive the support they need, and Obligors receive the credit of making a payment, timely.

There are instances where Parties decide to close their child support cases, come to their own child support payment agreement to make/receive child support between amongst themselves, and commence to doing so instead of going through child support agency(ies)/district attorneys' office(s) that enforce and manage their case(s). Likewise, there are Parents who come to their own agreement to make/receive child support between each other and commence to doing so instead of going through child support agency(ies)/district attorneys' office(s) to obtain an order, enforce and manage their case(s).

The challenges with this is inadequate record keeping of payments made and/or received by the Parties/Parents. This blockchain solution will not only track payments made, which credits the obligor/parent paying support, it will also expedite payments made, further decreasing the time it takes for Obligees/Parents 2 to receive much needed child support in a timely manner. In some embodiments, Parties/Parents will be able to print payments made using the blockchain solution for tax purposes, child support purposes, and other possible wants and/or needs.

The multilayered consortium ledger network using blockchain and self executing contracts along with a plurality of networks, are available to make the process of making, disbursing and receiving child support payments more efficient, faster, securely, on trackable platforms without limitation of its benefits. The examples mentioned are for illustrative purposes and is in no wise meant to limit the scope of the invention and its intended purposes.

Self executing contracts will be programmed to have the capability to carry Foreign and US fiat, cryptocurrency, child support tokens, stable coins and the like. Self executing contracts will be programmed to receive fiat, cryptocurrency, child support tokens, stable coins, carry and release fiat, cryptocurrency, child support tokens, stable coins when executed. The child support wallet is an example of one of the available receptacles of payments that will be available for use by users of the child support networks, systems and platforms without limitation.

In some embodiments, if Parents'/Parties' who may or may not have child support orders, want to make child support payment arrangements outside of using child support agencies, are able to make/receive child support payments amongst themselves by placing their agreed upon child support payment amount, personal, financial, and in addition but not limited to payment identifiers on self-executing contracts and submit them on an embodiment of the consortium ledger network. In yet other embodiments, the payment itself may be included on the self executing contract along with the child support payment amount, personal, financial, and in addition but not limited to payment identifiers. If the agreement needs to be updated, a new self executing contract is created between the involved parents/parties and submitted on the consortium network.

By providing multilayered consortium ledger networks using blockchain technologies, supporting data vehicles like distributed oracles, a plurality of database centers and cloud services, as well as but not limited to self executing contracts, child support payments can be made and disbursed through a verification process that is faster, secure, and immutable.

In some embodiments, the multilayered consortium ledger network will record child support payments made by employers and other senders of child support payments via self executing contracts, submit them to child support agencies/district attorney offices for their processing and disburse payments to Obligees. The multilayered consortium ledger network may be used by child support agencies locally and scale nationally as well as internationally. In some embodiments, the multilayered consortium ledger network has the capacity to receive payments from foreign employers and/or foreign sender of payments. The platform has the capacity to charge a fee for it's usage.

In some embodiments, child support payments may be made by Parents who do not have open child support cases. In these situations, the Parents come to an agreement as to what child support will be sent/received. That agreement is entered on a self executing contract and payments are sent and/or received per their agreement(s). The Parents may be in the United States or internationally located and are still able to make and receive child support payments.

In some embodiments, payments made directly on the blockchain platform and/or self executing contracts will go from domestic and/or foreign "sender of payments" to the child support agencies' system for credit of payments made. Once credit is given, child support payments are disbursed from payments placed directly in the self executing contracts and/or via foreign and/or domestic "sender of payments" financial institution directly to the Obligees and/or their legal representatives reciprocals of choice like but not limited to direct deposit, native wallet, and/or native card.

Self executing contract programmed to receive Parties and/or Parents identifying information, payments, and/or payment information needed by child support agencies to properly identify and confirm parties in their child support systems when cases are (re)opened.

Self-executing contract programmed to have the capability to convert payments made online, via phone systems, child support mobile applications, into US fiat, cryptocurrencies, child support tokens, stable coins using the multilayered consortium ledger network.

Self-executing contract programmed to have the capability to convert foreign fiat into US fiat, cryptocurrencies, child support tokens, and/or stable coins. In some embodiments, a self-executing contract will be programmed to convert foreign fiat using the LIBOR/variable interest rate at given value, currency of payment, currency rate, and time/date into US fiat/child support tokens/crypto currencies/et al.

Self-executing contract programmed to have the capability to carry Foreign and US fiat, cryptocurrency, child support tokens, stable coins, et al. Self-executing contract programmed to receive fiat, cryptocurrency, child support tokens, stable coins, carry and release fiat, cryptocurrency, child support tokens, stable coins when executed.

This platform will be used by all parties involved in the process of submitting and receiving child support payments. Each entity has a defined level of permission to access the ledger network and use the blockchain platform/technology. In addition to fiat usage on the ledger platform, child support tokens will be created and may be used by all parties to send and receive child support payments.

The child support token self-executing contract mints new coins and adds tokens to the network upon conversion request. If converted from fiat to child support tokens and back to fiat, the converted tokens are burnt to prevent double spending. Any form of payment can be converted into child support tokens at a 1:1 ratio. Once it is received by the Obligee and/or "Parent 2' they are able to convert the child support token to any currency supported by the blockchain and/or cryptographic platform.

A variable fee will be charged to users of the platform. Nodes within the consortium ledger network are a network of digital computer systems and has the capacity to scale globally. Self executing contracts are deployed on this platform when a payment is submitted from senders of payments. All payments made on the meshed consortium blockchain network have the benefit of it being trusted, immutable, faster, at a lower cost, lower manpower, and offers a lower overhead system.

The proposed invention is a solution to child support payments not being processed during holidays, child support payment processing center closures as well as other delays in payments being processed whether offices are open or closed. Currently, Obligors aren't given timely credit for making the payment and Obligees are not receiving child support payments timely. In some embodiments, Parents who make their own arrangements to make and/or receive child support payments from each other may use the consortium ledger network as it is reliable, trusted, secure, tracks and records payments made and/or received.

Payments can be made using domestic and foreign fiat, cryptocurrency, tokens, and stable coins supported by the consortium ledger network and/or converted to child support tokens in some embodiments. The consortium ledger network has the capacity to be, but not limited to, being centralized, decentralized, distributed, peer-to-peer, and/or meshed.

DRAWING

In some embodiments, the consortium ledger network uses blockchain technology to expedite the disbursement of child support payments from Obligors, including all "senders of child support payments/garnishments/levies/interceptions", for purposes of meeting court ordered child support obligations to Obligees. The consortium ledger network may be used independent of the child support agency and/or linked as a "plug and play" to the child support agency. As a "plug and play", it begins with all senders of payments submitting payments and/or appropriate identifiers via self executing contracts on the consortium ledger network. The self executing contracts are submitted and linked to child support agencies for verification of identifiers. After verification, the self executing contracts are triggered to release the payment placed on it or it's triggered to pull the funds from financial institutions and/or storages of currency. The payments are then disbursed to Obligees via their preferred reciprocal like bank account, child support wallet, and the like.

The consortium ledger network can be as central to the individual local agency(ies), inclusive of all child support agencies in one state/territory as well as but not limited to, it being as far reaching as child support agencies within multiple states/territories being linked via this ledger. The global child support agencies are able to utilize this ledger making it as central as a local child support agency's usage or as vast as national and international usage. This allows for centralized, decentralized, private, and consortium networks, and/or a combination thereof.

In yet other embodiments, Parents/Parties who do or don't have child support orders, are able to make child support payment arrangements outside of using child support agencies; are able to make/receive child support payments amongst themselves by placing their agreed upon child support payment amount and related identifiers on self-executing contracts and submit them on an embodiment of the consortium ledger network. In yet other embodiments, the payment itself may be included on the self executing contract along with the child support payment amount and related identifiers. If the agreement needs to be updated, a new self executing contract is created between the involved parents/parties and submitted on the consortium network. For illustrative purposes, the history of child support payments may be printed out and used by Parties and/or Parents for court purposes, child support and tax agencies' purposes and the like.

In the event child support case(s) are (re)opened there are records of who made the child support payment(s), child support payment(s) disbursed, and who received the payment. Child support payment records may be retrieved to prove what payments were made and/or received by the Parties/Parents.

The consortium ledger network supports payments made using, but not limited to, domestic/foreign fiat, cryptocurrencies, child support tokens, credit/debit payments, garnishments, ETF/ACH, and from financial institution. In some embodiments, payments are submitted directly on the ledger and/or via self-executing contracts submitted to/on the ledger linked to child support agency(ies') systems for verification; once verified, the self executing contracts are triggered to disburse to Obligees. As an option, payments submitted directly on the consortium ledger, without the use of self-executing contract(s), are also credited to the Obligors for whom the payments were made on behalf of, when payments are disbursed to the Obligees. The multilayer consortium ledger network allows it to work independently, or a combination of child support/district attorney agency (ies) locally, state/territory, nationally, internationally.

BRIEF DESCRIPTION OF DRAWINGS

FIG. 2 illustrates an embodiment of the multilayered consortium ledger network pertaining to payments made by senders of payments and disbursed to receivers of payments.

FIG. 3 illustrates another embodiment of the multilayered consortium ledger network disbursement structure in which the security layers are discussed.

This demonstrates some of the ways the multilayered consortium ledger network, with the use of other technologies like blockchain and self executing contracts, may be used to support a network of submitting child support payments, processing and distributing such payments.

DETAILED DESCRIPTION OF THE INVENTION

Figure 1:
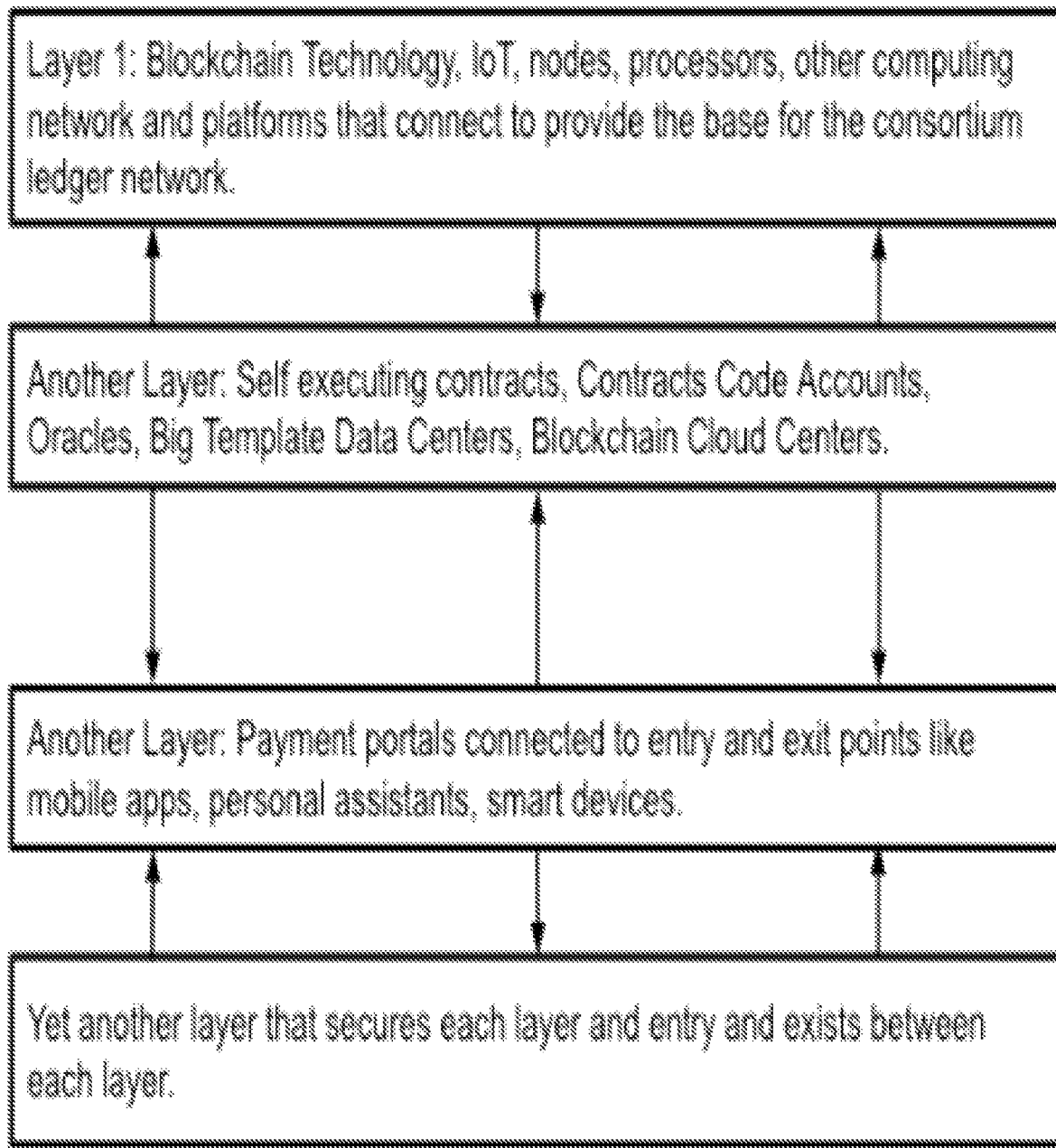
FIG. 1 illustrates an embodiment of the multilayered consortium ledger network disbursement structures.

FIG. 1 illustrates an embodiment of the multilayered child support disbursement structures in which a plurality of platforms, technologies, entities and the like are connected for the purposes of creating and maintaining multilayer consortium ledger networks used for making, processing, and disbursing child and family support payments from "senders of payments" to "receivers of payments" for mutual child(ren)/family members' family constructs; and the multilayer consortium ledger network is capable of charging and receiving variable fees for usage of the network, comprising in its entirety with full range of equivalents and modifications thereto. The genesis block is created. The genesis block is the first block created and represents block 0. Blockchain and other technologies are stored on every node a part of the network. This allows for a variety of blockchain and other platforms to work independently, or a combination thereof, in different orders, different embodiments and applications without limitation and are not meant to hinder or limit what is claimed.

In some embodiments, a plurality of components described here may be used in conjunction with the multilayered consortium ledger network: hardware, software, firmware, IoT technologies, without limitation and use of other technologies, Personal Area Network (PAN), a Local Area Network (LAN), a Wide Area Network (WAN), a Storage Area Network, a Metropolitan Area Network (MAN) a wireless network, a cellular communications network, a public switched telephone network and/or other network, hardware, and/or software that configures hardware without limitation, the internet, intranet, Wireless Application Protocol (WAP), Hypertext Transport Protocol (HTTP), Single Mail Transfer Protocol (SMTP), REST API, API, Direct Memory Access (DMA) and DMA controllers. A plurality of applications leveraging Software Development Kits (SDK), like apps, may be used in conjunction with REST API and/or other protocols, platforms, and technologies like blockchain and IoT. A plurality of protocols and entry and exit points may be used in addition to the ones mentioned here.

Another layer in the multilayered consortium ledger network contains multiple template containers, Contract Code Accounts; big data oracles, centralized, decentralized and distributed oracles as well as big blockchain cloud data centers as well as cloud data centers and cloud security systems. The multilayered consortium ledger network allows updates and modifications to various layers without impacting other portions of the framework. The plurality of entities that enable connecting to message queues and/or oracles, sending messages and receiving messages on the network. Plurality of node applications can be as local or broad, working independently or together or combination of the two with the capacity to scale worldwide. There is limitless numbers of interconnected computers & nodes.

Information may be stored on varying size integration circuits and/or gateways without limitation. The multilayered consortium ledger network supports database storage login verifications, notifications, location directories, and global mapping capabilities and has the capacity to be stored centrally and/or across a community of servers. It is connected to the web, mobile, telephone, desk tops, smart devices, as well as other auxiliary systems without limitations. The multilayer consortium ledger network is able to capture user data and acquire usage data like tallying the amount of payment transactions performed as a result of customer usage. In some embodiments, there's one-way communication, two-way communication, and/or multiple lines of communication.

In some embodiments, one or more may be used independently or in conjunction with each other without limitation: portable and/or personal computers, tablets, wireless devices and communication, desktop computers, laptops, smart phones, tablets, thin clients, printers, point of sale terminal (POS) like the "Square", smart devices, personal digital assistants, any internet-capable computer hardware device on a TCP/IP network, console, server and/or any appropriate computing device, or combination of devices. The platforms, protocols, data storage, databases may comprise software, hardware, firmware, and/or circuitry. They may be combined or divided differently as well as share similar functions. Users may switch from one blockchain application to another, one currency to another as well as to the child support token and one language to another language supported by the platform. The platforms and/or applications can be combined with each other as well as with other applications to build intelligent interactive experiences.

The range of operations described may be carried out at various times during the day. Also, the information sent between various protocols may be accomplished via a plurality of data networks, internet, intranet, blockchain technology, IoT, self executing contracts, oracles, big data storage centers, voice network, an Internet Protocol Network, a wireless device, a wired device and/or via a plurality of other protocols. Also, the messages sent or received may be sent or received directly and/or via one or more platforms/applications.

The protocols, processors, oracles, nodes and self executing contracts may be single instructions or a plurality. They may be localized or distributed with the capacity to scale globally over different self executing contracts, oracles, blockchain technologies, IoT, different programs and/or platforms and across a multitude of memory devices like big data storage centers without limitation and still achieve its purpose. Operational data may be collected as a single data set or distributed over different locations including over different storage devices, like but not limited to big blockchain data centers.

FIG. 2 illustrates an embodiment of the multilayered child support disbursement structures. The consortium ledger network supports multi factor verification processes for payments made using, but not limited to, domestic/foreign fiat, cryptocurrencies, child support tokens, credit/debit payments, garnishments, ETF/ACH, and from financial institutions. Child support tokens that are created a native token and hold no intrinsic value; acts as a placeholder while on the platform with a ratio of 1:1 with US fiat and the tokens can be converted back to supported fiats and/or cryptocurrencies by the receiver of payments. If the correct information is not entered during the multi factor verification process, the self executing contract will not deploy and the sender of payments will be asked to resubmit the correct information in order to successfully submit child support payments. In some embodiments, there are encrypted crypto signatures generation operations and decryption crypto signature verification operations. In some embodiments, foreign employers and/or foreign sender of payments may submit disbursement files to the Contract Code Account; self executing contract/agreement in the account will be triggered and convert foreign fiat/crypto currency via LIBOR/variable interest rate at given value, currency of payment, currency rate, time and date, and will send payment and participant identifiers via the appropriate payment platform. Payment receptacles may include electronic, digital, crypto, fiat wallets in addition but not limited to financial institutions and other payment receptacles: participants enter multi factor verification identifiers to access and withdrawal currencies out of the receptacles; the multilayered consortium ledger network supports and accepts a variable fee for usage of the network; and fees are charged and distributed as payment to the nodes and other entities as appropriate with accompanying security systems in place.

There are entry points for each of these platforms/methods of payment whether the web, mobile device, telephonic service and/or other entry point supported by the multilayered child support disbursement structures. Available funds are verified before payments can be submitted. Any form of payment can be converted into child support tokens on the meshed consortium distributed ledger at a 1:1 ratio. Once it is received by the "receiver of payments", they may convert it back to the currency of choice supported by the blockchain platform. It is the user's choice if they want to convert fiat/cryptocurrencies/tokens into child support tokens. Child support tokens have no intrinsic value in the child support system as it is a placeholder for the type of payment made while in the child support system. Native coins hold no intrinsic value.

The multilayered consortium ledger is distributed across several nodes, where data is replicated and stored instantly on each node a part of the network. When payments and/or transactions, like fees being paid, are made they are recorded in the blockchain, details of the payments and/or transactions are recorded, verified and reconciled across all of the nodes in the network. Depending on certain conditions, in some embodiments, payments are submitted directly on the ledger and/or self executing contracts and/or pulled from financial institutions and/or wallets. There is a plurality of template data storage centers, big data engines, central, distributed and meshed data centers, plurality of payment oracles and blockchain cloud centers associated with payment, processing of payments, disbursement, reimbursement of payments and the like without limitation.

The multilayered consortium ledger network has the capacity, but not limited, to be used as a "plug and play" with child support/district attorney offices that manage child support cases. Payments submitted on the multilayered consortium ledger network are linked to child support agency(ies') systems for verification of identifiers; once verified, the self executing contracts are triggered to disburse to Obligees. If the submitted information is rejected the senders of payments are notified and asked to correct/re-enter data and resubmit the payment(s).

Parties and/or Parents are able to make/receive child support payments amongst themselves by multi factor verification process to access account, place their agreed upon child support payment amount(s) and related identifiers on self-executing contracts, acknowledge agreement, sign and submit them on an embodiment of the consortium ledger network. If the agreement needs to be updated, a new self executing contract is created between the involved parents/parties and submitted on the consortium network.

In other embodiments, once a year, parties/parents are able to select which family unit they are sending payments to. During the rest of the year, all payments made will disburse evenly amongst each family unit the sender of payments has within the network. Parties/Parents are able to close and reopen their account at any time.

In some embodiments the consortium distributed ledger may be connected directly to financial institutions for automatic recurring payments by sender of payments where personally identifiable information, payment details, court ordered amount and/or payment amount is entered onto the self executing contract, confirmed and disbursed on preset dates.

In some embodiments, Parties/Parents' mobile devices and/or personal computing devices temporarily act as "nodes" that power their own transactions on the blockchain. The fee is low and the cost to send the transaction is low. Their reward may be native tokens: Child Support Tokens. They do not have value now but in some embodiments, value will be valuated as they become accumulated and accepted in place of fiat, crypto currencies and tokens. The Parties'/Parents' and/or other users' payment and/or transaction history(ies) are public to their own history(ies) and closed to 3rd parties unless the Parties'/Parents' and/or other users allow 3rd party(ies) to view their personal transactions.

The multilayered consortium ledger networks can be as central to the individual local agency(ies), inclusive of all child support agencies, and/or function independently. It may be used by Parties/Parents who want to use a secure and trackable way to send payments amongst themselves outside of child support agencies. There are implications of its usage being central as well as its usage being national and international. This allows for centralized, decentralized, private, and consortium networks, and/or a combination thereof without limitation to the technologies and platforms used.

The multilayered consortium ledger network has the capacity to collect and store all users personal and payment identifiers in consortium centralized, decentralized, distributed databases, blockchain and IoT cloud databases, big storage units and the like and/or similar IoT big storage and retrieval centers using a plurality of technologies without limitations. The plurality of data and cloud databases and/or storage units will be able to capture all information entered including but limited to "sender of payment" information, parties/parents and children's names, DOBs, last four of SSN, payment identifiers, payments made and disbursed and employer information. Parties/Parents are able to retrieve payment history amongst other items. The multilayered consortium ledger network has the capacity to return and refund payments to senders of payments when appropriate. In some embodiments, the payment database centers may be used to help facilitate payment verification and reconciliation of funds submitted on the networks.

In some embodiments, child support payments will be made via the phone services through the phone's automated system or with a live representative, identifiers are entered on a self executing contract, payment funds confirmed and entered, and once deployed and verified via the consortium ledger network and/or child support agency system, payments are dispersed from the sender of payments' financial institution and/or the self executing contract itself and sent to the receiver of payments.

In some embodiments, when a payment is made via a payment kiosk, participant and payment information is entered onto the blockchain via self executing contract/ agreement linked to the kiosks mainframe system.

The multilayered consortium ledger network supports payment receptacles including but not limiting to financial institution, child support wallets, cryptocurrency wallet, fiat wallet, mobile app, and other means; participants enter multi factor verification identifiers to access and withdrawal currencies out of the receptacles.

These embodiments demonstrate some of the ways the multilayered consortium ledger networks may be used to support child/family support payments being made by senders of payments and distributed to Obligees, Parties/Parents (receivers of payments).

FIG. 3 illustrates another embodiment of the multilayered child support disbursement structures in which the security layers are discussed. Each layer within the consortium ledger network, there is a security layer associated with it. In addition, at each connection point between layers as well as connection points with the outside world, there are advanced security structures and measures in place to detect, block, and respond to access attempts and other risky activities on each layer, each connection point within the structures, as well as but not limited to each endpoint to the outside world. Security protection of computer networks that are remotely bridged to client devices are in place as well. A multi factor verification layer is added, advanced detection and response to attacks is implemented. Security layer is at each level, with each protocol and application in the architecture.

In some embodiments, cloud-based security is used to secure network data, user data and data obtained and stored on the network. In some embodiments, blockchain cloud security will be used to break up the user's data into smaller chunks to store in the blockchain cloud network. An additional layer of security is present and distributed throughout the network. In some embodiments, the hashing function, public and private keys' encryption and transaction ledgers are used and maintained.

Security measures are taken to include but is not limited to the reduction and/or elimination of spam, provide update services, encryption of files and data at rest, in motion, and via mobile device usage, firewall services, multi factor authentication to protect data, establish a baseline and routinely review networks to close existing vulnerabilities and usage of big data engines to review events and security logs to protect against advanced threats.

Figure 4:
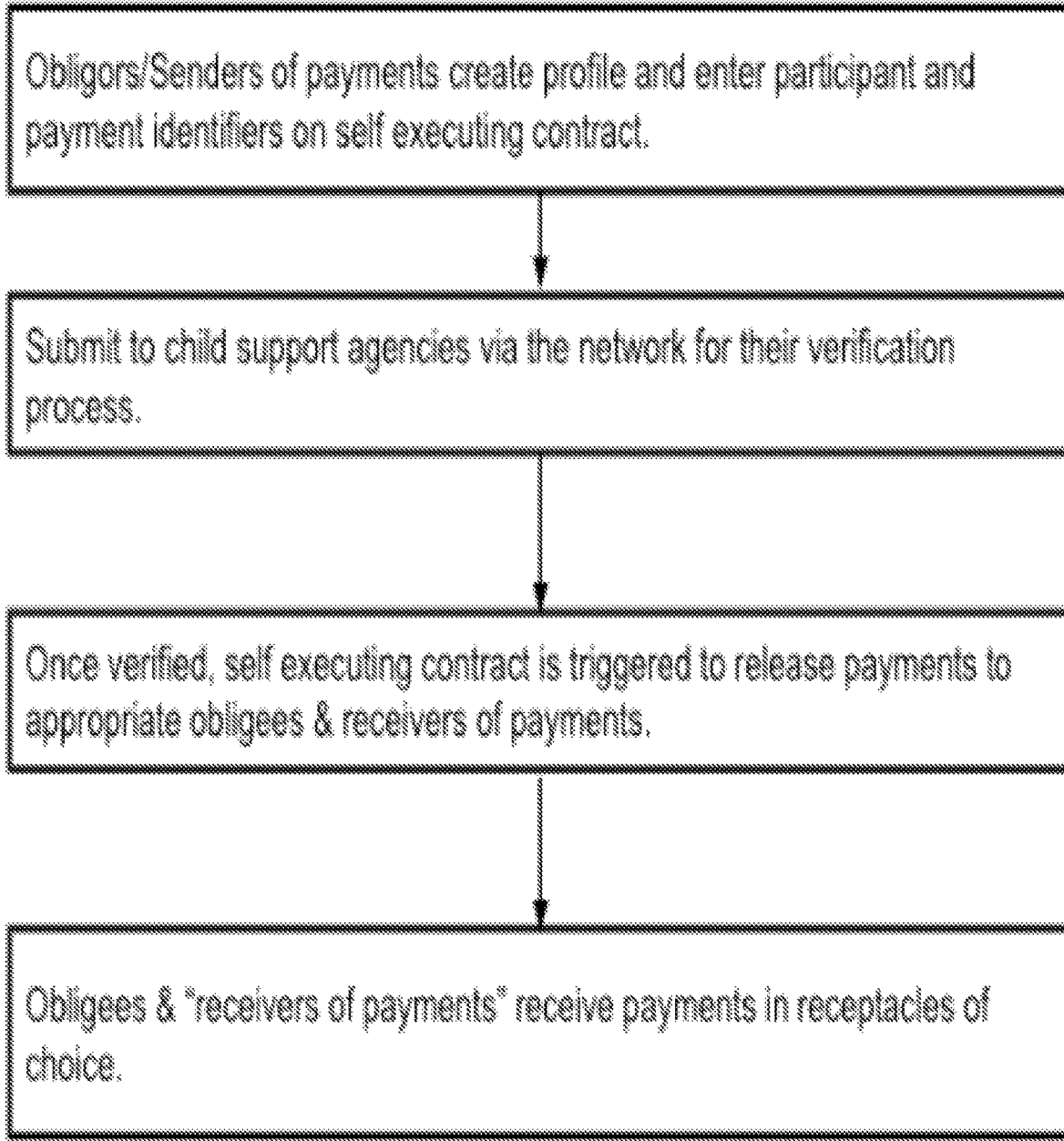
FIG. 4 illustrates yet another embodiment of the multilayered child support disbursement structures which may function as a "plug and play" to the child support agencies/district attorney offices.

FIG. 4 illustrates yet another embodiment of the multi-layered child support disbursement structures linked as a "plug and play" to child support/district attorney agencies. The consortium ledger network may be used independent of child support agencies/district attorneys' offices who manage child support cases as well as those who process child support payments. As a "plug and play", it begins with "senders of child support payments" submitting payments and/or appropriate identifiers that capture who is sending the payments, obligor identifiers, payment amounts, and Obligees identifiers, via self executing contracts on the consortium ledger network.

The payment and/or self executing contracts are submitted on the consortium ledger network and linked to child support agencies for verification of identifiers via the consortium ledger network. After verification, the self executing contracts are triggered to release the payments placed on it or it's triggered to pull the funds from financial institutions and/or storages of currency, like crypto wallets. The payments are then disbursed to Obligees via their preferred receptacles like bank accounts, child support wallets, and the like. If a payment is not verified, the self executing contracts are rejected by the child support agencies, the self executing contract is pre-coded to notify the sender to correct and resubmit information entered on the self executing contracts.

The multilayered consortium ledger network may be used for a variety of purposes. For example, it is capable of supporting profile information being entered in self executing contracts, deployed directly on the consortium ledger network, managed from profile (re)opening to profile closure and processing payments made by using self-executing contracts and other technologies.

Figure 5:
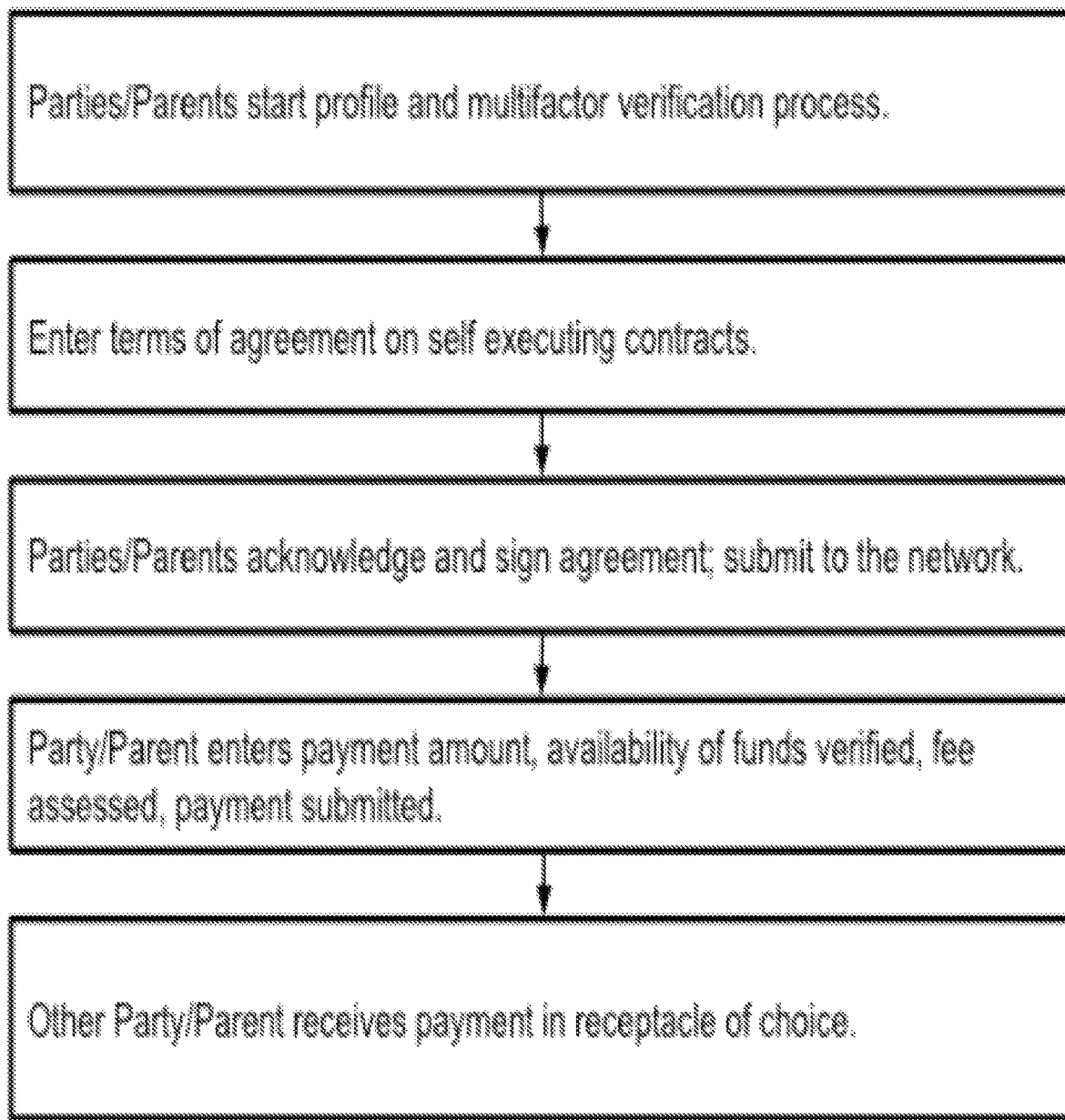
FIG. 5 illustrates another embodiment of the multilayered child support disbursement structure in which Parents/Parties who may or may not have child support orders, are able to use the platform to make and/or receive child support payments outside of using child support agencies.

FIG. 5 illustrates another embodiment of the multilayered child support disbursement structures in which Parties and/ or Parents who may or may not have child support orders are able to use the multi-use platform to make and/or receive child support payment outside of using child support/district attorney agencies. In an embodiment of this process, they would register to use the platform via a variety of channels like the web, mobile app, and the like. The parents and/or parties would complete an application that is inputted in self executing contracts starting with their first and last name along with their middle initial and email address; participate in a multi factor verification process before completing the rest of the application. The application process consists of executing the two-step verification process that was created. As they continue, the previous identifiers entered would auto populate in the appropriate fields and they would proceed to enter the agreement terms that consist of but not limited to their DOB and last four of their SSN, the other parent's first and last name, DOB, last four of SSN, mutual child(ren's) name and DOB, child/family support agreed to pay/receive, and for how long the agreement is for. Both parties/parents would sign/acknowledge they agree to the terms.

Parties/Parents are able to make/receive child support payments amongst themselves by two step verification process to access account, place their agreed upon child support payment amount, frequency of payments, personal, financial, and in addition but not limited to payment identifiers on self-executing contracts and submit them on an embodiment of the consortium ledger network. The ledger records who made every payment, every payment disbursed, and who received every payment. In the event child support case(s) are (re)opened there are records of who made the child support payment(s), child support payment(s) disbursed, and who received the payment. If the agreement needs to be updated, a new self executing contract is created between the involved parents/parties and submitted on the consortium network.

In some embodiments, the history of child/family support payments may be printed out and used by Parties and/or Parents and/or legal guardians for court purposes, child/ family support and tax agencies' purposes and the like. In the event child support case(s) and or profiles are (re)opened there are records of who made the child support payment(s), child support payment(s) disbursed, and who received the payment. Child support payment records may be retrieved from platform data to prove what payments were made, by whom, and/or received, by whom.

This invention may, however, be embodied in many different forms and should not be construed as limited to the embodiments mentioned herein. Embodiments are provided so that this disclosure will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. The meaning of any terms expressed is dependent upon the context within which it is used, and the meaning may be expressly modified.

The invention claimed is:

1. A method for using a multilayered consortium ledger network and blockchain cloud technologies for entering, sending, receiving, storing, retrieving, disbursing a plurality of family support data, payments, and transactions, the method comprising:
deploying a computing system that communicatively links a blockchain cloud network to a computing device associated with a plurality of user-types, wherein the plurality of user-types comprise one of: a plurality of first users and a plurality of second users, wherein the plurality of first users and the plurality of second users comprise one of: a plurality of individuals, a plurality of businesses, a plurality of agencies, and a plurality of third parties, wherein the plurality of third parties comprise at least one of: a plurality of parties on behalf of the plurality of first users, a plurality of parties on behalf of the plurality of second users, a plurality of parties on behalf of the plurality of businesses, and a plurality of parties on behalf of the plurality of agencies;
wherein the blockchain cloud network comprises a plurality of blockchain cloud network nodes, wherein at least one of the plurality of blockchain cloud network nodes consists of at least one: computing device nodes associated with the plurality of user types, a plurality of blockchain cloud network contract code account nodes, and a plurality of blockchain cloud network nodes, wherein the blockchain cloud network comprises at least one memory device;
wherein the blockchain cloud network is in communication with a plurality of computing devices associated with the plurality of user-types;
wherein a processor of the blockchain cloud network prompts completion of a multifactor verification process associated with at least one user-type;
verifying, by the processor of the blockchain cloud network, through the multifactor verification process, the at least one user-type;
prompting, by the processor of the blockchain cloud network, completion of an application displayed on a computing device of the at least one user-type, wherein the at least one user-type is at least one first user, wherein the application requests entry of at least one: a plurality of identifiers, a plurality of data, a plurality of payment types, a plurality of transactions, and a plurality of blockchain cloud network blockchain cloud network variable platform usage fee payments;
entering, by the computing device of the at least one first user, the requested information, wherein the information entered generates code of a self-executing contract;
signing, by the computing device of the at least one first user, confirmation of the information entered and terms of agreement of blockchain cloud network usage by a plurality of signature types;
submitting, by the computing device of the at least one first user-type, the signed self-executing contract to the processor of the blockchain cloud network;
receiving, by the processor of the blockchain cloud network, the signed self-executing contract submitted by the at least one first user;
creating, by the processor of the blockchain cloud network, at least one blockchain cloud network contract code account, wherein the at least one blockchain cloud network contract code account comprises: a plurality of code;
linking, by the processor of the blockchain cloud network, the at least one blockchain cloud network contract code account and the computing device of the at least one first user;
receiving, by the at least one blockchain cloud network contract code account, the signed self-executing contract;
submitting, by the at least one blockchain cloud network contract code account, the signed self-executing contract to at least one computing device associated with at least one second user;
linking, by the processor of the blockchain cloud network, the at least one blockchain cloud network contract code account with the at least one computing device associated with the at least one second user;
receiving, by the at least one blockchain cloud network contract code account, the signed self-executing contract to the at least one computing device associated with the at least one second user for verification;
determining, by the at least one computing device associated with the at least one second user, a verification of the signed self-executing contract;
confirming, by the at least one computing device associated with the at least one second user, the verification of the signed self-executing contract;
broadcasting, by the blockchain cloud network, in response to the verification by the at least one computing device associated with the at least one second user, the verified signed self-executing contract to the blockchain cloud network;
receiving, by the blockchain cloud network, in response to receiving the broadcast by the at least one computing device associated with the at least one second user, the verified signed self-executing contract;
triggering, by the blockchain cloud network, in response to receiving the broadcast by the at least one computing device associated with the at least one second user, a release of at least one verified signed self-executing contract contents per code of an at least one verified self-executing contract;
storing, by the blockchain cloud network, in response to receiving the broadcast by the computing device associated with the at least one second user, a plurality of contents of at least one verified self-executing contract to the plurality of blockchain cloud network nodes, wherein at least one verified signed self-executing contract contents are stored in a plurality of smaller chunks per the code of the at least one verified signed self-executing contract;
disbursing, by the blockchain cloud network, in response to receiving the broadcast by the computing device associated with the at least one second user, the release of the at least one verified self-executing contract contents per code; and disbursing, by the plurality of blockchain cloud network nodes of the blockchain cloud network, the plurality of blockchain cloud network variable platform usage fee payments to the plurality of blockchain cloud network nodes as payment for blockchain cloud network node services.

2. A multilayered consortium ledger network and blockchain technologies for entering, sending, receiving, storing, retrieving, disbursing a plurality of family support data, payments, and transactions, the multilayered consortium ledger network comprising:

a memory storing one or more instructions;

at least one processor that when executing the one or more instructions is configured to perform the following steps:

deploying a computing system that communicatively links a blockchain cloud network to a computing device associated with a plurality of user-types, wherein the plurality of user-types comprise one of: a plurality of first users and a plurality of second users, wherein the plurality of first users and the plurality of second users comprise one of: a plurality of individuals, a plurality of businesses, a plurality of agencies, and a plurality of third parties, wherein the plurality of third parties comprise at least one of: a plurality of parties on behalf of the plurality of first users, a plurality of parties on behalf of the plurality of second users, a plurality of parties on behalf of the plurality of businesses, and a plurality of parties on behalf of the plurality of agencies;

wherein the blockchain cloud network comprises a plurality of blockchain cloud network nodes, wherein at least one of the plurality of blockchain cloud network nodes consists of at least one: computing device nodes associated with the plurality of user types, a plurality of blockchain cloud network contract code account nodes, and a plurality of blockchain cloud network nodes, wherein the blockchain clud network comprises at least one memory device;

wherein the blockchain cloud network is in communication with a plurality of computing devices associated with the plurality of user-types;

wherein a processor of the blockchain cloud network prompts completion of a multifactor verification process associated with at least one user-type;

verifying, by the processor of the blockchain cloud network, through the multifactor verification process, the at least one user-type;

prompting, by the processor of the blockchain cloud network, completion of an application displayed on a computing device of the at least one user-type, wherein the at least one user-type is at least one first user, wherein the application requests entry of at least one: a plurality of identifiers, a plurality of data, a plurality of payment types, a plurality of transactions, and a plurality of blockchain cloud network blockchain cloud network variable platform usage fee payments;

entering, by the computing device of at least one first user, the requested information, wherein the information entered generates code of a self-executing contract;

signing, by the computing device of the at least one first user, confirmation of the information entered and terms of agreement of blockchain cloud network usage by a plurality of signature types;

submitting, by the computing device of the at least one first user-type, the signed self-executing contract to the processor of the blockchain cloud network;

receiving, by the processor of the blockchain cloud network, the signed self-executing contract submitted by the at least one first user;

creating, by the processor of the blockchain cloud network, at least one blockchain cloud network contract code account, wherein the at least one blockchain cloud network contract code account comprises: a plurality of code;

linking, by the processor of the blockchain cloud network, at least one blockchain cloud network contract code account and the computing device of the at least one first user;

receiving, by the at least one blockchain cloud network contract code account, the signed self-executing contract;

submitting, by the at least one blockchain cloud network contract code account, the signed self-executing contract to at least one computing device associated with at least one second user;

linking, by the processor of the blockchain cloud network, the at least one blockchain cloud network contract code account with the at least one computing device associated with the at least one second user;

receiving, by the at least one blockchain cloud network contract code account, the signed self-executing contract to the at least one computing device associated with the at least one second user for verification;

determining, by the at least one computing device associated with the at least one second user, a verification of the signed self-executing contract;

confirming, by the at least one computing device associated with the at least one second user, the verification of the signed self-executing contract;

broadcasting, by the blockchain cloud network, in response to the verification by the at least one computing device associated with the at least one second user, the verified signed self-executing contract to the blockchain cloud network;

receiving, by the blockchain cloud network, in response to receiving the broadcast by the at least one computing device associated with the at least one second user, the verified signed self-executing contract;

triggering, by the blockchain cloud network, in response to receiving the broadcast by the at least one computing device associated with the at least one second user, a release of at least one verified signed self-executing contract contents per code of an at least one verified self-executing contract;

storing, by the blockchain cloud network, in response to receiving the broadcast by the computing device associated with the at least one second user, a plurality of contents of at least one verified self-executing contract to the plurality of blockchain cloud network nodes, wherein at least one signed verified self-executing contract contents are stored in a plurality of smaller chunks per the code of the at least one verified signed self-executing contract;

disbursing, by the blockchain cloud network, in response to receiving the broadcast by the computing device associated with the at least one second user, the release of the at least one verified self-executing contract contents per code; and disbursing, by the plurality of blockchain cloud network nodes of the blockchain cloud network, the plurality of blockchain cloud network variable platform usage fee payments to the plurality of blockchain cloud network nodes as payment for blockchain cloud network node services.

3. A non-transitory computer readable medium that stores one or more instructions that when executed by a processor of a multilayered consortium ledger network performs the following steps:

deploying a computing system that communicatively links a blockchain cloud network to a computing device associated with a plurality of user-types, wherein the plurality of user-types comprise one of: a plurality of first users and a plurality of second users, wherein the plurality of first users and the plurality of second users comprise one of: a plurality of individuals, a plurality of businesses, a plurality of agencies, and a plurality of third parties, wherein the plurality of third parties comprise at least one of: a plurality of parties on behalf of the plurality of first users, a plurality of parties on behalf of the plurality of second users, a plurality of parties on behalf of the plurality of businesses, and a plurality of parties on behalf of the plurality of agencies;

wherein the blockchain cloud network comprises a plurality of blockchain cloud network nodes, wherein at least one of the plurality of blockchain cloud network nodes consists of at least one: computing device nodes associated with the plurality of user types, a plurality of blockchain cloud network contract code account nodes, and a plurality of blockchain cloud network nodes, wherein the blockchain cloud network comprises at least one memory device;

wherein the blockchain cloud network is in communication with a plurality of computing devices associated with the plurality of user-types;

wherein a processor of the blockchain cloud network prompts completion of a multifactor verification process associated with at least one user-type;

verifying, by the processor of the blockchain cloud network, through the multifactor verification process, the at least one user-type;

prompting, by the processor of the blockchain cloud network, completion of an application displayed on a computing device of the at least one user-type, wherein the at least one user-type is at least one first user, wherein the application requests entry of at least one: a plurality of identifiers, a plurality of data, a plurality of payment types, a plurality of transactions, and a plurality of blockchain cloud network blockchain cloud network variable platform usage fee payments;

entering, by the computing device of the at least one first user, the requested information, wherein the information entered generates code of a self-executing contract;

signing, by the computing device of the at least one first user, confirmation of the information entered and terms of agreement of blockchain cloud network usage by a plurality of signature types;

submitting, by the computing device of the at least one first user-type, the signed self-executing contract to the processor of the blockchain cloud network;

receiving, by the processor of the blockchain cloud network, the signed self-executing contract submitted by the at least one first user;

creating, by the processor of the blockchain cloud network, at least one blockchain cloud network contract code account, wherein the at least one blockchain cloud network contract code account comprises: a plurality of code;

linking, by the processor of the blockchain cloud network, the at least one blockchain cloud network contract code account and the computing device of the at least one first user;

receiving, by the at least one blockchain cloud network contract code account, the signed self-executing contract;

submitting, by the at least one blockchain cloud network contract code account, the signed self-executing contract to at least one computing device associated with at least one second user;

linking, by the processor of the blockchain cloud network, the at least one blockchain cloud network contract code account with the at least one computing device associated with the at least one second user;

receiving, by the at least one blockchain cloud network contract code account, the signed self-executing contract to the at least one computing device associated with the at least one second user for verification;

determining, by the at least one computing device associated with the at least one second user, a verification of the signed self-executing contract;

confirming, by the at least one computing device associated with the at least one second user, the verification of the signed self-executing contract;

broadcasting, by the blockchain cloud network, in response to the verification by the at least one computing device associated with the at least one second user, the verified signed self-executing contract to the blockchain cloud network;

receiving, by the blockchain cloud network, in response to receiving the broadcast by the at least one computing device associated with the at least one second user, the verified signed self-executing contract;

triggering, by the blockchain cloud network, in response to receiving the broadcast by the at least one computing device associated with the at least one second user, a release of at least one verified signed self-executing contract contents per code of an at least one verified self-executing contract;

storing, by the blockchain cloud network, in response to receiving the broadcast by the computing device associated with the at least one second user, a plurality of contents of at least one verified self-executing contract to the plurality of blockchain cloud network nodes, wherein at least one verified signed self-executing contract contents are stored in a plurality of smaller chunks per the code of the at least one verified signed self-executing contract;

disbursing, by the blockchain cloud network, in response to receiving the broadcast by the computing device associated with the at least one second user, the release of the at least one verified self-executing contract contents per code; and disbursing, by the plurality of blockchain cloud network nodes of the blockchain cloud network, the plurality of blockchain cloud network variable platform usage fee payments to the plurality of blockchain cloud network nodes as payment for blockchain cloud network node services.

* * * * *